(12) United States Patent
Miura

(10) Patent No.: US 6,201,603 B1
(45) Date of Patent: Mar. 13, 2001

(54) POSITION DETECTING APPARATUS FOR SEMICONDUCTOR WAFER

(75) Inventor: Yasutada Miura, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/253,960

(22) Filed: Feb. 22, 1999

(30) Foreign Application Priority Data

Feb. 25, 1998 (JP) .................................................. 10-043435

(51) Int. Cl.$^7$ .............................. G01B 11/14; G01J 5/02; G01N 21/86
(52) U.S. Cl. .................. 356/375; 250/341.4; 250/559.29; 250/559.36
(58) Field of Search .......................... 356/375, 399–401, 356/384–387, 426; 250/559.29, 559.36, 341.1, 341.4

(56) References Cited

U.S. PATENT DOCUMENTS 4,887,904 * 12/1989 Nakazato et al. .................... 356/375

FOREIGN PATENT DOCUMENTS 5-226459 9/1993 (JP) .
11-54595 2/1999 (JP) .

* cited by examiner

Primary Examiner—Frank G. Font
Assistant Examiner—Amanda Merlino
(74) Attorney, Agent, or Firm—Frishauf, Holtz, Goodman, Langer & Chick, P.C.

(57) ABSTRACT

A position detecting apparatus for a semiconductor wafer includes a wafer worktable supported by an X-Y stage. The worktable is rotatable about an axis on a reference center for positioning the wafer. The apparatus also includes a photoelectric sensor arranged to correspond to the edge region of the wafer on the worktable. The photoelectric sensor includes an infrared-ray emitting LED and a collimator lens for applying a parallel luminous flux to the wafer edge region, and a photo diode facing the collimator lens through the wafer edge region, all arranged on the optical axis. The photo diode outputs a signal having a level corresponding to a received light quantity. The photoelectric sensor also includes a light shielding slit plate having a slit arranged on the optical axis.

21 Claims, 5 Drawing Sheets

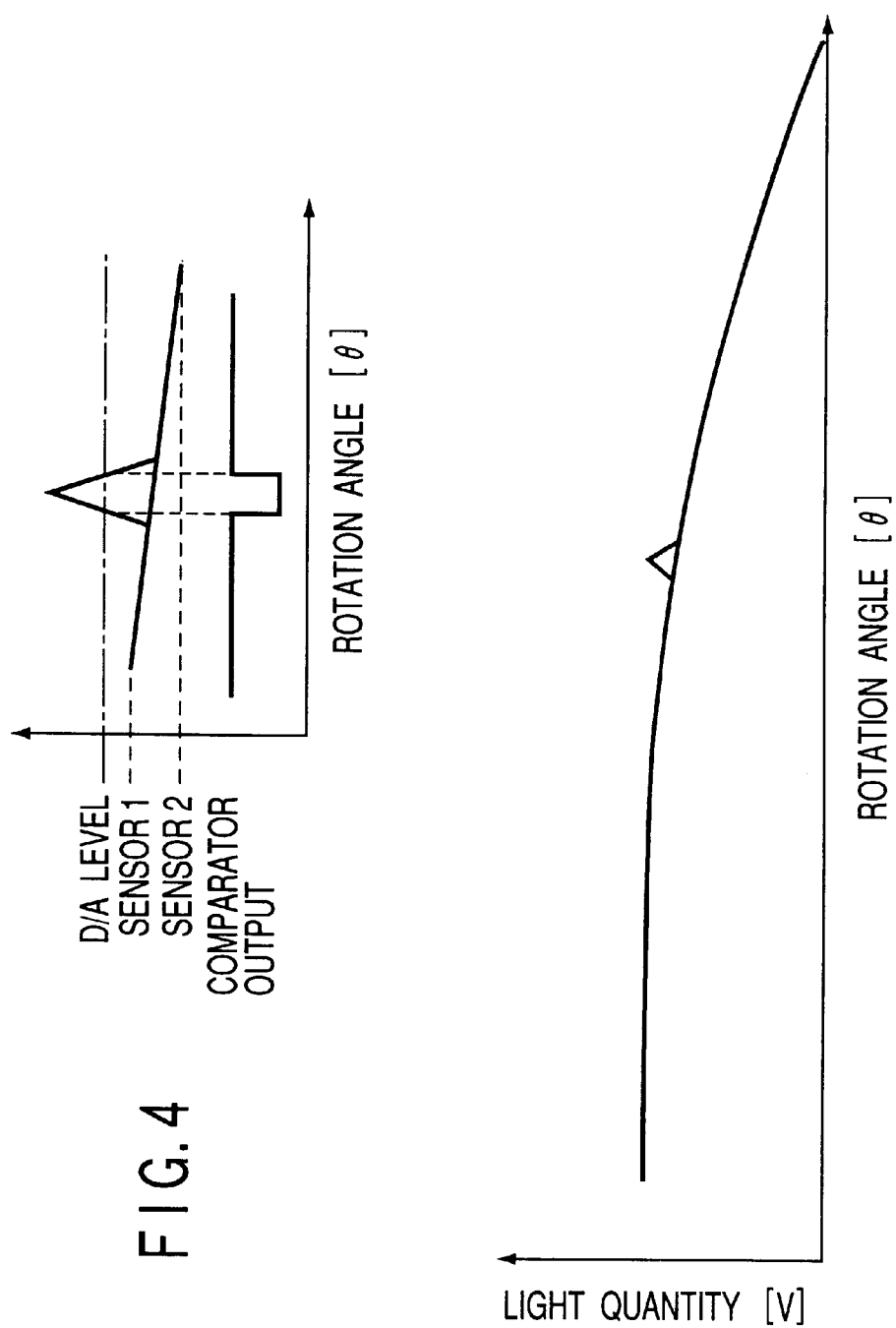

POSITION DETECTING APPARATUS FOR SEMICONDUCTOR WAFER

BACKGROUND OF THE INVENTION

The present invention relates to an apparatus employed in a system for treating semiconductor devices, such as a manufacturing system or an examining or inspecting system, to detect a positional shift of a semiconductor wafer, i.e., the central position and the like of the wafer relative to a reference center for positioning the wafer.

In a system for treating semiconductor devices, such as a manufacturing system or an examining or inspection system, a wafer is subjected to a positioning operation with reference to an orientation flat or notch, before the wafer is processed or examined.

In an apparatus for performing such a positioning operation, a wafer is held on a worktable, which is rotated by a motor. Adjacent to the worktable, the light emitting and light receiving members of a photoelectric sensor are arranged to interpose the edge region of the wafer therebetween. Note that "the edge region of a wafer" means a region including the edge and part thereabouts of the wafer.

During rotation of the wafer, the light emitting member of the photoelectric sensor emits light rays, such that the optical axis crosses the wafer edge region. The light receiving member receives part of the light rays which have not been shaded by the wafer, and then outputs electric signals representing the received light rays.

A motor control section receives the output signals of the photoelectric sensor, and the orientation flat or notch of the wafer is detected on the basis of the output signal. Then, a motor is rotated, so that the orientation flat or notch of the wafer is moved to a predetermined position.

Further, the edge region of the wafer is pushed by a positioning pusher to move the wafer in a direction perpendicular to the rotational axis of the motor, so that the center of the wafer is aligned with the rotational axis of the motor. However, when the wafer edge region is pushed by the pusher to align the center of the wafer with the rotational axis of the motor, the wafer may be damaged or stained by an impact applied by the pusher or friction between the wafer and the worktable.

In order to counter such a problem, Jpn. Pat. Appln. KOKAI Publication No. 5-226459 discloses a technique of positioning a wafer without any contact therewith.

In this technique, there are arranged an X-directional-position detecting unit, a Y-directional-position detecting unit, and a mechanism for correcting these units, to observe the wafer edge region. These units and mechanism make the whole structure complicated and expensive. Besides, this technique can be applied to a wafer having an orientation flat, but not to a wafer having a notch.

As described above, positioning a wafer by pushing its edge region damages or stains the wafer. On the other hand, positioning a wafer without contact makes an apparatus complicated and costly.

BRIEF SUMMARY OF THE INVENTION

It is an object of the present invention to provide a compact and inexpensive apparatus which can precisely detect the center of a semiconductor wafer.

It is another object of the present invention to provide a compact and inexpensive apparatus which can precisely position the center of a semiconductor wafer without contact.

According to a first aspect of the present invention, there is provided a position detecting apparatus for a semiconductor wafer comprising:

(a) a support for supporting the wafer such that a reference center for positioning the wafer is positioned in a contour of the wafer;

(b) an optical detecting mechanism arranged to correspond to an edge region of the wafer supported by the support, the optical detecting mechanism comprising, a light emitter for emitting a parallel luminous flux to the edge region of the wafer supported by the support, a light receiver for receiving the parallel luminous flux, arranged on an optical axis of the light emitter to face the light emitter through the edge region of the wafer supported by the support, the light receiver being arranged to output a signal having a level corresponding to a received light quantity, and a light shielding slit plate having a slit arranged on an optical path of the parallel luminous flux, the slit having such a width in an angular direction relative to the reference center, that is set to be narrow enough to cause a degree of shading of the parallel luminous flux by the wafer to be a one-dimensional data in a radial direction relative to the reference center;

(c) a driver for selectively moving the wafer supported by the support and the optical detecting mechanism relative to each other in an angular direction relative to the reference center; and (d) an arithmetic section for computing a central position of the wafer relative to the reference center, from output levels of the light receiver, which are obtained when at least three positions on the edge region of the wafer are placed between the light emitter and the light receiver, and the parallel luminous flux is partly shaded by the wafer.

According to a second aspect of the present invention, there is provided a position detecting apparatus for a semiconductor wafer comprising:

(a) a worktable for supporting the wafer, the worktable is rotatable about a rotational axis on a reference center for positioning the wafer;

(b) an optical detecting mechanism arranged to correspond to an edge region of the wafer supported by the worktable, the optical detecting mechanism comprising, a light emitter for emitting a parallel luminous flux to the edge region of the wafer supported by the worktable, a light receiver for receiving the parallel luminous flux, arranged on an optical axis of the light emitter to face the light emitter through the edge region of the wafer supported by the worktable, the light receiver being arranged to output a signal having a level corresponding to a received light quantity, and a light shielding slit plate having a slit arranged on an optical path of the parallel luminous flux, the slit having such a width in an angular direction relative to the reference center, that is set to be narrow enough to cause a degree of shading of the parallel luminous flux by the wafer to be a one-dimensional data in a radial direction relative to the reference center;

(c) a driver for selectively rotating the worktable; and (d) an arithmetic section for computing a central position of the wafer relative to the reference center, from output levels of the light receiver, which are obtained when at least three positions on the edge region of the wafer are placed between the light emitter and the light receiver, and the parallel luminous flux is partly shaded by the wafer.

According to a third aspect of the present invention, there is provided a position detecting apparatus for a semiconductor wafer comprising:

(a) a support for supporting the wafer such that a reference center for positioning the wafer is positioned in a contour of the wafer;

(b) optical detecting mechanisms arranged to correspond to at least three positions on an edge region of the wafer supported by the support, each of the optical detecting mechanisms comprising, a light emitter for emitting a parallel luminous flux to the edge region of the wafer supported by the support, a light receiver for receiving the parallel luminous flux, arranged on an optical axis of the light emitter to face the light emitter through the edge region of the wafer supported by the support, the light receiver being arranged to output a signal having a level corresponding to a received light quantity, and a light shielding slit plate having a slit arranged on an optical path of the parallel luminous flux, the slit having such a width in an angular direction relative to the reference center, that is set to be narrow enough to cause a degree of shading of the parallel luminous flux by the wafer to be a one-dimensional data in a radial direction relative to the reference center;

(c) an arithmetic section for computing a central position of the wafer relative to the reference center, from output levels of the light receivers of the optical detecting mechanisms, which are obtained when the parallel luminous flux is partly shaded by the wafer between the light emitter and the light receiver in each of the optical detecting mechanisms.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a graph for explaining a method of detecting the notch of a wafer by the photoelectric sensor and moving it to a predetermined position;

FIG. 5 is a graph showing an output signal level (light quantity) from the photoelectric sensor when the edge region including the notch of the wafer is detected while the wafer is rotated by a large rotational angle;

DETAILED DESCRIPTION OF THE INVENTION

Figure 1:
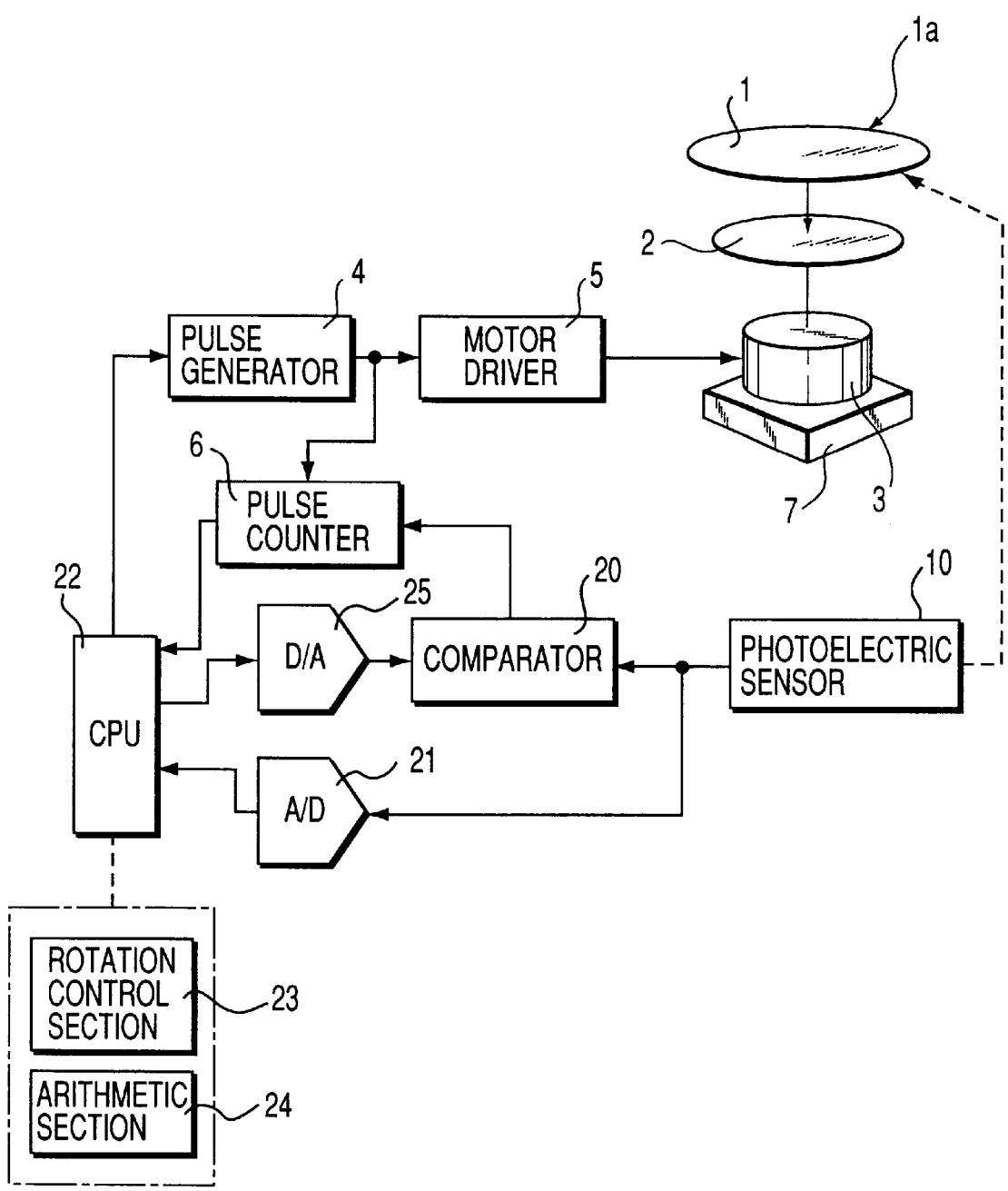
FIG. 1 is a block diagram showing a position detecting apparatus for a semiconductor wafer according to an embodiment of the present invention.

Embodiments of the present invention will be described hereinafter with reference to the accompanying drawing. In the following description, the constituent elements having substantially the same function and arrangement are denoted by the same reference numerals, and a repetitive description will be made only when necessary.

FIG. 1 is a block diagram showing a position detecting apparatus for a semiconductor wafer according to an embodiment of the present invention.

A rotatable worktable 2 for holding a semiconductor wafer 1 is connected to a rotational shaft of a motor 3. The worktable 2 is driven to rotate while attracting and holding the wafer 1 thereon. The rotational axis of the worktable 2 is aligned with a reference center 2a (see FIG. 3) for positioning the wafer.

In the driving system for the motor 3, a pulse generated in a pulse generator 4 is sent to a motor driver 5 to drive the motor 3. The pulse generated by the pulse generator 4 is also sent to the pulse counter 6.

The motor 3, worktable 2, and the like are supported by an X-Y stage 7, and moved in a horizontal plane by the stage 7. The stage 7 is operated under the control of a CPU 22 described later.

An optical sensing section, i.e., a photoelectric sensor 10 is arranged to correspond to the edge region of the wafer 1 mounted on the worktable 2. Note that "the edge region of a wafer" means a region including the edge and part thereabouts of the wafer. Preferably, the photoelectric sensor 10 is arranged such that its optical axis, connecting a light emitting member and a light receiving member, coincides with a position separated from the rotational center of the worktable 2, i.e., the reference center 2a for positioning the wafer, by a distance equal to the radius R (see FIG. 3) of the wafer 1 to be observed. The photoelectric sensor 10 outputs a signal having a level corresponding to a received light quantity, i.e., that part of the light rays, emitted to the edge region 1a of the wafer 1, which are not shaded by the wafer 1.

Figure 2:
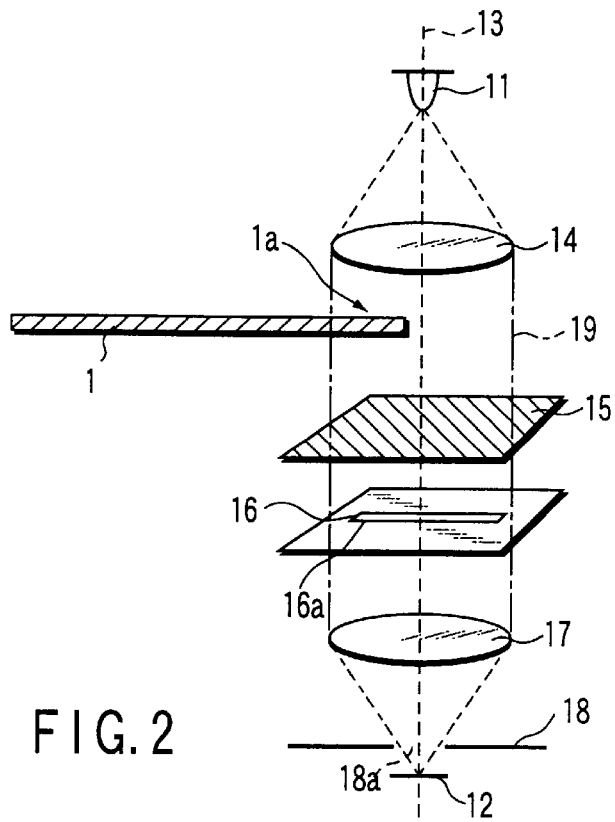
FIG. 2 is structural view showing a photoelectric sensor employed in the apparatus shown in FIG. 1.

FIG. 2 is structural view showing the photoelectric sensor 10.

An infrared-ray emitting LED 11, i.e., light emitting member, and a photo diode 12, i.e., light receiving member, are arranged to face each other with the wafer edge region 1a interposed therebetween. On the optical axis 13 between the infrared-ray emitting LED 11 and the photo diode 12, there are arranged a collimator lens 14, an infrared-ray transmission filter 15, a slit plate 16, an image formation lens 17, and a pinhole plate 18.

The collimator lens 14 is used for causing infrared rays emitted from the infrared-ray emitting LED 11 to change into a parallel luminous flux 19, which is incident onto the wafer edge region 1a. The combination of the infrared-ray emitting LED 11 and the infrared-ray transmission filter 15 is advantageous for decreasing noises due to visible light rays.

The distance between the collimator lens 14 and the infrared-ray transmission filter 15 is determined in consideration of the intensity of light rays emitted from the infrared-ray emitting LED 11 and the intensity of light rays received by the photo diode 12. The distance between the collimator lens 14 and the infrared-ray transmission filter 15 is also designed to allow the wafer edge region 1a to be inserted therebetween.

The slit plate 16 is formed of a light shielding member having a rectangular slit 16a. The slit 16a extends in a radial direction relative to the rotational center of the worktable 2, i.e., the reference center 2a for positioning the wafer. The slit 16a has a width substantially constant over its entire length in the longitudinal direction. The center of the slit 16a in the longitudinal direction, i.e., the center of balance, coincides with the optical axis 13 of the photoelectric sensor 10. In other words, the center of the slit 16a is preferably located at a position separated from the reference center 2a by a distance equal to the radius of the wafer 1.

The width of the slit 16a in an angular direction relative to the reference center 2a is set to be narrow enough to cause the degree of shading of the parallel luminous flux 19 by the wafer 1 to be a one-dimensional data in a radial direction relative to the reference center 2a. Specifically, the width of the slit 16a is set to be preferably from 0.2 to 5 mm, and more preferably from 0.5 to 3 mm. In experiments, where the slit 16a was set to have a width of from 0.5 to 1 mm, with a length of 10 mm, good results were obtained.

The slit plate 16 is disposed close to or in contact with the infrared-ray transmission filter 15, and adjacent to the image formation lens 17. The slit plate 16 and the infrared-ray transmission filter 15 can be disposed anywhere between the collimator lens 14 and the image formation lens 17. It is advantageous, however, to arrange them in a barrel between the wafer and the image formation lens 17, as shown in FIG. 2, so that extraneous disturbance light rays are less influential. The infrared-ray transmission filter 15 may be disposed adjacent to the pinhole plate 18.

The pinhole plate 18 is formed of a light shielding member having a circular pinhole 18a. The pinhole 18a is located at or near the focus of the image formation lens 17. The size of the pinhole is set to be almost equal to the size of a luminous flux at the pinhole 18a, which is obtained by bringing the parallel luminous flux 19, narrowed by the slit plate 16, to the focus of the image formation lens 17. In other words, the pinhole 18a is arranged on the optical axis of the luminous flux 19 at a position immediately before the photo diode 12.

The pinhole plate 18 is used to cut out extraneous disturbance light rays and allow only light rays emitted from the infrared-ray emitting LED 11 to pass onto the photo diode 12, so that the S/N ratio is improved. Accordingly, the pinhole plate 18 may be omitted, if there are no extraneous disturbance light rays.

The output signals of the photoelectric sensor 10 described above are sent to a comparator 20, and further to the CPU 22 in the apparatus main body through an A/D converter 21. The CPU 22 takes in digitized output signals from the photoelectric sensor 10, on the levels of which, the CPU 22 detects the central position of the wafer 1 and the central position of the orientation flat or notch.

Specifically, the CPU 22 has functions, such as a rotation control section 23 and an arithmetic section 24.

The rotation control section 23 sends a command for driving the motor 3 of the worktable 2 to the pulse generator 4, so that the worktable 2 is rotated and stopped at positions corresponding to predetermined positions on the wafer edge region 1a. For example, the worktable 2 is rotated by rotational angles of 120° at regular intervals, so that three positions on the wafer edge region 1a are sequentially placed right on the optical axis of the photoelectric sensor 10.

The arithmetic section 24 computes the central position of the wafer 1 on the basis of output levels from the photoelectric sensor 10, obtained at the three positions on the wafer edge region 1a, while the wafer 1 is rotated by rotational angle intervals of 120°. The arithmetic section 24 also computes the central position of the orientation flat or notch on the basis of the distance between edges on the opposite ends of the orientation flat or notch.

The CPU 22 also has a function of setting a level for detecting the orientation flat or notch, at a D/A converter 25.

An explanation will be given to an operation of the apparatus thus constructed, with reference to FIG. 3, etc. In the following explanation, three positions "A", "B", and "C" are used as observation targets on the wafer edge region 1a. However, in FIG. 3, these positions are shown on a circle HC having a radius of R, the same as that of the wafer 1, relative to the reference center 2a, for the sake of simplicity.

Generally, a wafer is picked up by a transfer unit from a wafer cassette onto a worktable, on which it is subjected to operations for positioning its center and orientation flat. Then, for example, in the case of an inspection apparatus, the wafer is transferred onto a stage of a microscope, so that it can be observed by the microscope. Similarly, in the apparatus according to the present invention, the wafer 1 is transferred onto the worktable 2 by a transfer unit, and is subjected to operations for positioning its center and orientation flat, before the wafer 1 is observed by a microscope. At this time, the wafer 1 is placed such that the first position "A" on the wafer edge region 1a is placed right at the photoelectric sensor 10. The operation of locating the central position of the wafer 1 starts from the first position "A".

Then, the infrared-ray emitting LED 11 of the photoelectric sensor 10 emits light rays to the first position "A". The light rays are changed to the parallel luminous flux 19 by the collimator lens 14 and incident onto the wafer edge region 1a. That part of the luminous flux, which has not been shaded by the wafer 1, passes through the infrared-ray transmission filter 15 and the slit 16a, and focuses into an image on the photo diode 12 by the image formation lens 17 through the pinhole 18a.

The photo diode 12 outputs an electric signal of a level corresponding to a light quantity received thereby at this time. The electric signal output from the photo diode 12 is digitized by the A/D converter 21 and then is sent to the CPU 22. In other words, the CPU 22 takes in an electric signal relating to the first position "A", which is output by the photoelectric sensor 10, and digitized by the A/D converter 21.

Then, the rotation control section 23 of the CPU 22 sends a command for rotating the wafer 1, e.g., clockwise by 120° to the pulse generator 4. The pulse generator 4 generates pulses and sends them to the motor driver 5, which then rotates the motor 3 by 120° in accordance with this command. By doing so, the worktable 2 is rotated clockwise by 120°, so that the second position "B" on the wafer edge region 1a is moved to the position of the photoelectric sensor 10.

Then, the infrared-ray emitting LED 11 of the photoelectric sensor 10 emits light rays also to the second position "B". That part of the luminous flux, which has not been shaded by the wafer 1, focuses into an image on the photo diode 12.

The photo diode 12 outputs an electric signal of a level corresponding to a light quantity received thereby at this time. The CPU 22 takes in an electric signal relating to the second position "B", which is output by the photoelectric sensor 10, and digitized by the A/D converter 21.

Then, the rotation control section 23 of the CPU 22 sends a command for rotating the wafer 1 clockwise further by 120° to the pulse generator 4. Thus, the worktable 2 is rotated clockwise further by 120°, so that the third position "C" on the wafer edge region 1a is moved to the position of the photoelectric sensor 10.

Then, the infrared-ray emitting LED 11 of the photoelectric sensor 10 emits light rays also to the third position "C". That part of the luminous flux, which has not been shaded by the wafer 1, focuses into an image on the photo diode 12.

The photo diode 12 outputs an electric signal of a level corresponding to a light quantity received thereby at this time. The CPU 22 takes in an electric signal relating to the third position "C", which is output by the photoelectric sensor 10, and digitized by the A/D converter 21.

As described above, three output signal levels of the photoelectric sensor 10 are obtained at the three positions on the wafer edge region 1a, and then they are processed to locate the central position of the wafer 1, as follows.

In advance, the CPU 22 takes in an output signal of the photoelectric sensor 10 through the A/D converter 21 when the wafer 1 is not mounted on the worktable 2, and sets the take-in signal value as "SensorMax".

The output signal level of the photoelectric sensor 10 is in proportion to the ratio of that area of the slit 16a which is not covered with the wafer 1, relative to the entire area of the slit 16a. For example, when the edge of the wafer 1 is right on the optical axis 13, the photoelectric sensor 10 outputs a signal level half that output when the wafer 1 is absent. This is because, the optical axis 13 of the photoelectric sensor 10 is arranged to pass through the center of balance, or the center in the longitudinal direction, of the slit 16a.

It is provided here that the size of the slit 16a is determined in advance, and a signal level output by the photoelectric sensor 10 when the slit 16a is completely covered with the wafer 1 is set as "SensorLevel". The distance L between the optical axis 13 and the edge of the wafer 1 is obtained by the following formula:

$$L = \{0.5 - (\text{SensorLevel}/\text{SensorMax})\} \times (\text{the longitudinal side length of the slit } 16a) \quad (1)$$

Specifically, the distance L represents as to how distant the edge of the wafer 1 is from the center of the slit 16a, when each of the positions "A", "B", and "C" is placed at the photoelectric sensor 10.

Figure 3:
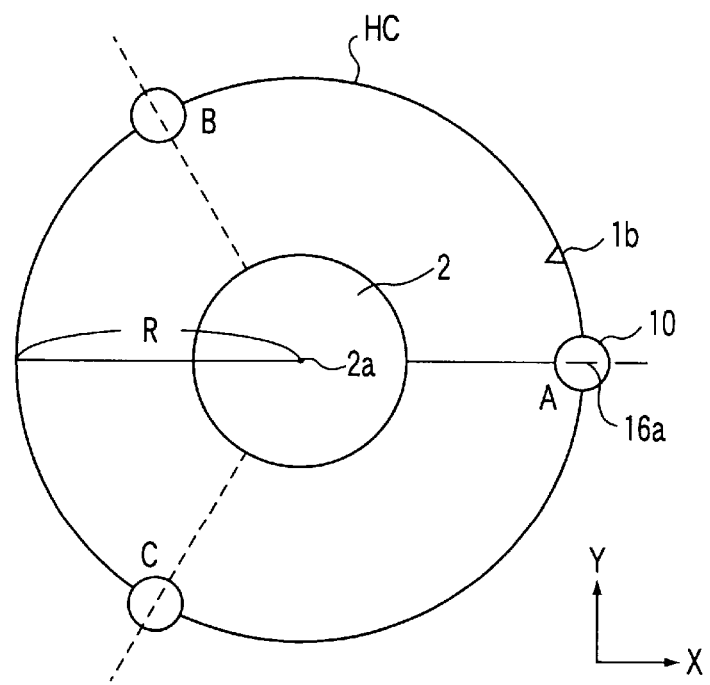
FIG. 3 is a plan view schematically showing the position of the photoelectric sensor, and positions on the wafer edge region to be observed in the apparatus shown in FIG. 1.

Accordingly, in a coordinate system having the origin (0, 0) at the rotational axis of the worktable 2, i.e., the reference center 2a, as shown in FIG. 3, the coordinates of the edge of the wafer 1 at each of the first to third positions "A", "B", and "C" are. expressed, as follows. It is provided here that distances La, Lb, and Lc are obtained as the distance L by the formula (1) on the basis of signal levels output by the photoelectric sensor 10 at the first to third positions "A", "B", and "C".

The coordinates at the first position "A":
((the radius of the wafer 1+La), 0)
The coordinates at the second position "B":
(Cos 120°×(the radius of the wafer 1+Lb), sin 120°×(the radius of the wafer 1+Lb))
The coordinates at the third position "C":
(cos 240°×(the radius of the wafer 1+Lc), sin 240°×(the radius of the wafer 1+Lc))

The arithmetic section 24 computes the coordinates of the center of the wafer 1 from these coordinates. Since a method of calculating the central coordinates of a circle from the coordinates of three points on its circumference is well known, no explanation will be given thereto.

After computing the central coordinates of the wafer 1, i.e., a positional shift amount of the wafer 1 relative to the reference center 2a, the CPU 22 drives the X-Y stage 7 on the basis of the data to align the center of the wafer 1 with the reference center 2a.

An explanation will be given to a method of detecting the orientation flat or notch of the wafer 1 by the photoelectric sensor 10, and moving it to a predetermined position, with reference to FIGS. 3 to 5. In FIG. 4, the horizontal axis denotes the rotational angle θ of the wafer. In FIG. 5, the vertical axis denotes light quantity, and the horizontal axis denotes the rotational angle θ of the wafer.

Generally, the orientation flats or notches of wafers are roughly aligned at a position in a wafer cassette. In this case, when the wafer 1 is transferred onto the worktable 2 by the transfer unit, the position of the orientation flat or notch is roughly known. Upon this premise, the following explanation will be made, using a the notch as an example.

As shown in FIG. 3, when the notch 1b of the wafer 1 is distant from the photoelectric sensor 10, which is aligned with the first position "A", the CPU 22 takes in the output signal of the photoelectric sensor 10 through the A/D converter 21, and sets the take-in signal value corresponding to the first position "A" as "Sensor 1", as shown in FIG. 4.

Then, the CPU 22 causes the wafer 1 to be rotated by the worktable 2, so that the notch 1b passes completely through the view of the photoelectric sensor 10. The rotation amount of the wafer 1 for moving the notch 1b may be determined in light of variation in the position of the notch 1b in a wafer cassette. On the basis of the determined rotational amount, the rotation control section 23 of the CPU 22 sends a command for, e.g., a clockwise rotational angle θ1 to the pulse generator 4, and the worktable 2 is rotated. The CPU 22 takes in the output signal of the photoelectric sensor 10 through the A/D converter 21, and sets the take-in signal value corresponding to a position on the wafer edge region after the rotation of the wafer by the rotational angle θ1 as "Sensor 2" as shown in FIG. 4.

Then, the CPU 22 compares Sensor 1 and Sensor 2 with each other, and sets the output level to the D/A converter 25, i.e., D/A Level, to be higher than a higher one of Sensor 1 and Sensor 2, e.g., Sensor 1. This set level has to be higher than the sum of Sensor 1 and a potential noise level, as shown in FIG. 4.

After setting the D/A converter 25, the rotation control section 23 of the CPU 22 sends a command for, e.g., a counterclockwise rotational angle θ1 to the pulse generator 4, and the worktable 2 is rotated in the reverse direction.

During this time, the comparator 20 compares the output signal level of the photoelectric sensor 10 and the output level of the D/A converter 25, i.e., D/A Level, with each other, as shown in FIG. 4. As a result, when the output signal level of the photoelectric sensor 10 becomes higher than the D/A Level, the comparator 20 outputs a low level signal, which is then sent to the pulse counter 6.

The pulse counter 6 counts the pulses when the motor 3 is rotated by the rotational angle θ1 in the reverse direction, and stores the counted values corresponding to dropping and rising edges of the signal level of the comparator 20. The central position of the notch 1b is identified by a value half the sum of these two counted values.

The notch 1b of the wafer 1 should be moved to a position close to the photoelectric sensor 10 for the reason described below. Specifically, when the wafer 1 is placed on the worktable 2 by the transfer unit, the center of the wafer 1 is generally slightly off the rotational center of the worktable 2. Where the wafer 1 is rotated from this state by a large rotational angle, the output signal level of the photoelectric sensor 10 along the edge of the wafer 1 becomes waved due to the eccentric placement of the wafer, as shown in FIG. 5.

Where the output signal level of the photoelectric sensor 10 is greatly waved, the portion of the output signal level of the photoelectric sensor 10 corresponding to the notch 1b of the wafer 1 is hidden by other portions of the output signal level of the photoelectric sensor 10 corresponding to other portions on the edge of the wafer 1. In this case, the notch 1b is hard to identify on the basis of the output signal level of the comparator 20. In order to prevent such a problem, it is effective to first move the notch 1b of the wafer 1 to a position close to the photoelectric sensor 10.

In the above described embodiment, the predetermined positions "A", "B", and "C" on the wafer edge region 1a are moved sequentially to the photoelectric sensor 10, so that the central position of the wafer 1 is computed on the basis of output signals of the photoelectric sensor 10 at these times. In other words, the photoelectric sensor 10 is used as a position detecting sensor for detecting the positions "A", "B", and "C" on the wafer edge portions 1a to locate the central position of the wafer 1. Since the positions of the wafer 1 are detected by the photoelectric sensor 10 using the slit 16a, the entire apparatus can be made compact and inexpensive.

In the above described embodiment, when the notch 1b (or orientation flat) is detected, the notch 1b is first moved to a position close to the photoelectric sensor 1. Then, the output signal level of the photoelectric sensor 10 along the wafer edge portion 1a is confirmed to set the output level of the D/A converter 25 to be sent to the comparator 20. Accordingly, even if the center of the wafer 1 is off the rotational center of the worktable 2, the notch 1b or orientation flat can be detected.

In the above described embodiment, the X-Y stage 7 is driven to align the center of the wafer 1 with the reference center 2a, i.e., to correct the shift of the central position of the wafer 1, so that the wafer 1 is accurately positioned. For example, when a wafer 1 is transferred to the micro-observation station of a microscope or the like, the wafer 1 is accurately positioned, and thus the wafer can be accurately inspected. Further, when the shift of the central position of the wafer 1 is corrected, the wafer 1 is not slid on a worktable, and thus the wafer 1 is prevented from being contaminated.

Where the worktable and the photoelectric sensor are supported on the X-Y stage in, e.g., an inspection apparatus, such as a microscope, the wafer is accurately positioned, without reference to influences of mechanical control errors of the transfer unit. Where the X-Y stage is employed, the light emitting member and the light receiving member may not be arranged as a unit. Either one of the light emitting member and the light receiving member may be fixed to a base on which the X-Y stage is mounted.

When measurement starts, there may be a case where the orientation flat or notch is positioned right at the photoelectric sensor 10. In such a case, the position of the orientation flat or notch may be identified by another unit. Then, the apparatus according to the present invention is provided with the necessary data by this unit, so that the central position of the wafer 1 is detected without being bothered by the orientation flat or notch. The orientation flat or notch may be moved back to the original position, after the central position of the wafer 1 is detected.

There may be a case where the position of the notch 1b (or orientation flat) is not at all known when the wafer 1 is placed on the worktable by the transfer unit. In this case, the output signals of the photoelectric sensor 10 to be input to the comparator 20 may be caused to pass through a high-pass filter (HPF), so that a fluctuation in the output signals of the photoelectric sensor 10 due to eccentric placement of the wafer 1 is removed. With this operation, part of the output signals of the photoelectric sensor 10 corresponding to the notch 1b can be picked up.

Furthermore, in the above described embodiment, the orientation flat or notch may be first detected, and the central position of the wafer 1 may be then detected. In this case, the difference in the output signal level of the photoelectric sensor 10 between the edge of the wafer 1 and the orientation flat or notch may be used to identify the position of the orientation flat or notch. When the output signal level is differentiated, that part corresponding to the orientation flat or notch comes to have a largest differential coefficient.

Figure 6:
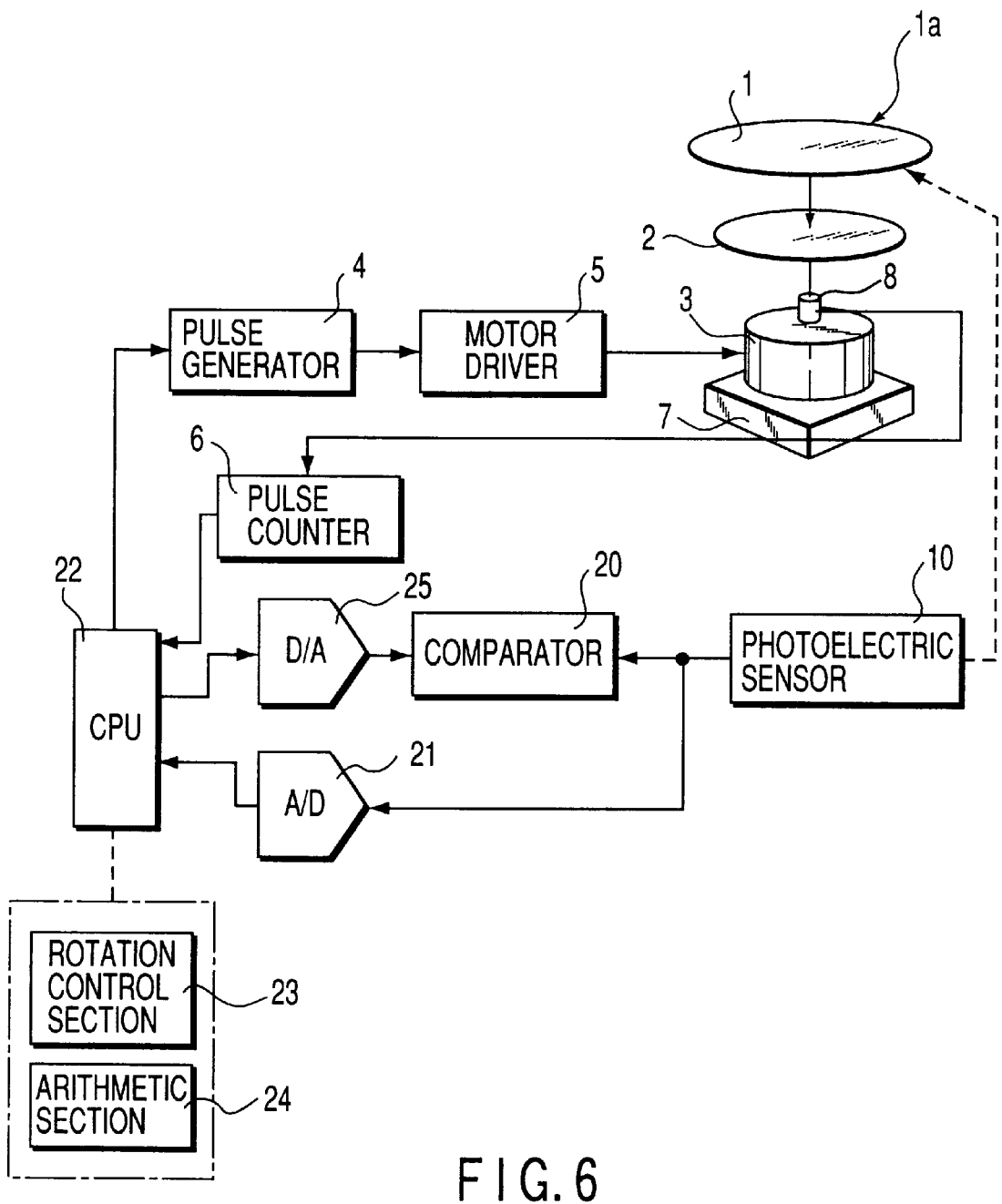
FIG. 6 is a block diagram showing a position detecting apparatus for a semiconductor wafer according to another embodiment of the present invention.

FIG. 6 is a block diagram showing a position detecting apparatus for a semiconductor wafer according to another embodiment of the present invention.

In this embodiment, an encoder 8 is attached to the rotational shaft of a motor 3, so that the detection signals of the encoder 8 are sent to a pulse counter 6. The pulse signals generated by a pulse generator 4 are not directly sent to the pulse counter 6. This arrangement is effective in solving problems due to time lags between the pulses generated by the pulse generator 4 and the rotation of the motor 3, for example, when an AC servo motor is used as the motor 3.

Figure 7:
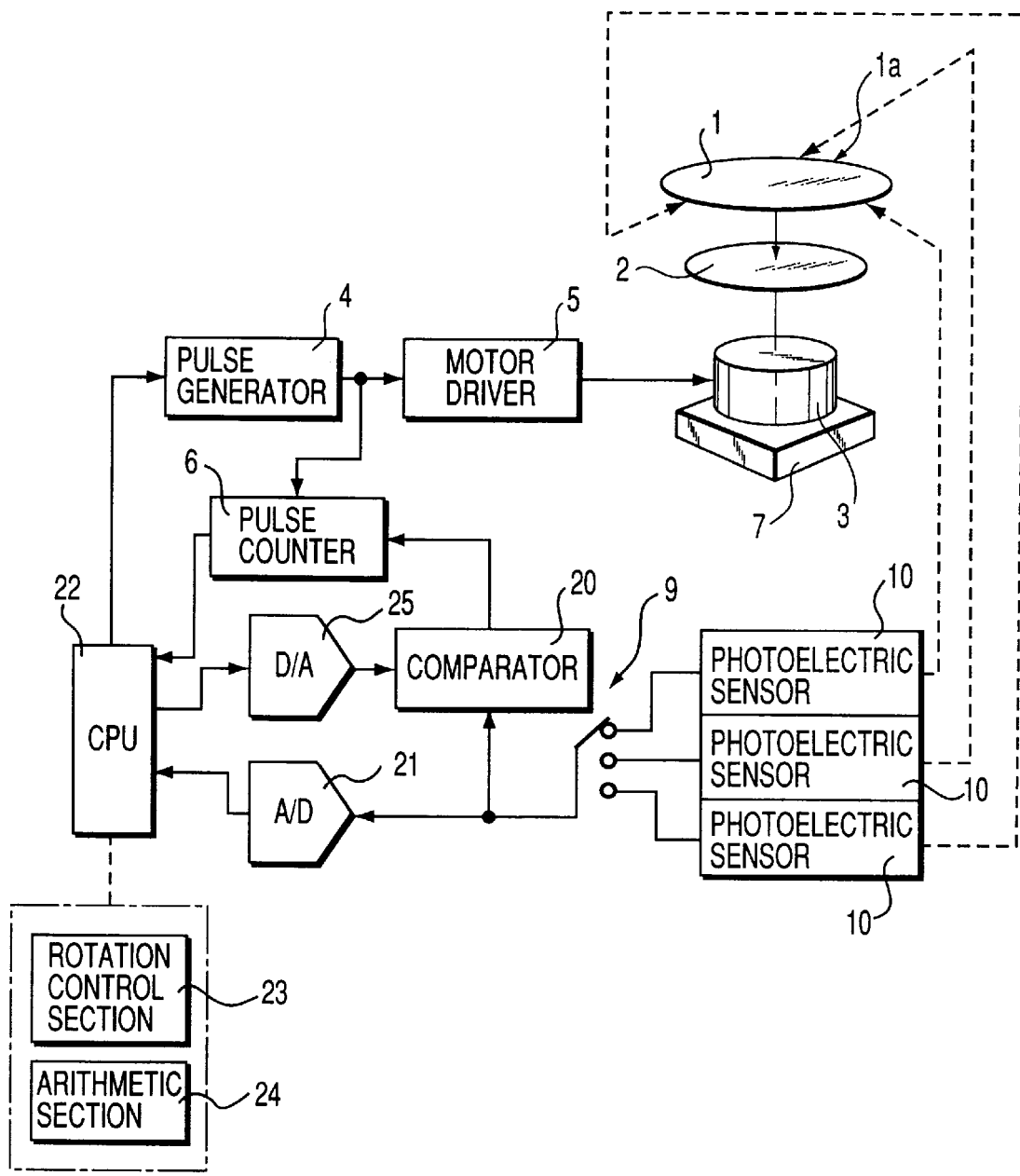
FIG. 7 is a block diagram showing a position detecting apparatus for a semiconductor wafer according to still another embodiment of the present invention.

FIG. 7 is a block diagram showing a position detecting apparatus for a semiconductor wafer according to still another embodiment of the present invention.

In this embodiment, three photoelectric sensors 10 are arranged at regular angular intervals of 120°, to correspond to the edge region of a wafer 1. Each of the photoelectric sensors 10 has a structure explained with reference to FIG. 2. The three photoelectric sensors 10 share a common signal processing system, and any one of the photoelectric sensors is selectively connected to the signal processing system by a switching mechanism 9. This arrangement is advantageous in that there is no need to rotate the wafer 1 when the central position of the wafer 1 is detected.

In the above described three embodiments, the central position of the wafer 1 is computed while three positions on the wafer edge region 1a are observed. However, four or more positions may be observed to accurately detect the central position of the wafer 1. Further, in the above described three embodiments, the observed three positions on the wafer edge region 1a are located at regular angular intervals of 120°. The intervals are not limited to 120° or regular ones, as far as the values of the angular intervals are known in advance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A position detecting apparatus for a semiconductor wafer comprising:

(a) a support for supporting the wafer such that a reference center for positioning the wafer is positioned in a contour of the wafer;

(b) an optical detecting mechanism arranged to correspond to an edge region of the wafer supported by said support, said optical detecting mechanism comprising, a light emitter for emitting a parallel luminous flux to the edge region of the wafer supported by said support, a light receiver for receiving the parallel luminous flux, arranged on an optical axis of said light emitter to face said light emitter through the edge region of the wafer supported by said support, said light receiver being arranged to output a signal having a level corresponding to a received light quantity, and a light shielding slit plate having a slit arranged on an optical path of the parallel luminous flux, said slit having such a width in an angular direction relative to said reference center, that is set to be narrow enough to cause a degree of shading of the parallel luminous flux by the wafer to be a one-dimensional data in a radial direction relative to said reference center;

(c) a driver for selectively moving the wafer supported by said support and said optical detecting mechanism relative to each other in an angular direction relative to said reference center; and (d) an arithmetic section for computing a central position of the wafer relative to said reference center, from output levels of said light receiver, which are obtained when at least three positions on the edge region of the wafer are placed between said light emitter and said light receiver, and the parallel luminous flux is partly shaded by the wafer.

2. The apparatus according to claim 1, wherein said width of said slit is set to fall in a range of 0.2 to 5 mm.

3. The apparatus according to claim 1, wherein said slit has a center at a position separated from said reference center by a distance substantially equal to a radius of the wafer.

4. The apparatus according to claim 1, wherein said slit extends in a radial direction relative to said reference center, and said width of said slit is substantially constant all over a length of the slit.

5. The apparatus according to claim 1, wherein the parallel luminous flux comprises infrared rays, and an infrared-ray transmission filter is arranged on the optical path of the parallel luminous flux.

6. The apparatus according to claim 1, wherein a light shielding pinhole plate having a pinhole on the optical axis of said light emitter is arranged immediately before the light receiver.

7. The apparatus according to claim 1, further comprising an X-Y stage supporting said support, and means for controlling said X-Y stage, based on the central position of the wafer relative to said reference center computed by said arithmetic section.

8. A position detecting apparatus for a semiconductor wafer comprising:

(a) a worktable for supporting the wafer, said worktable is rotatable about a rotational axis on a reference center for positioning the wafer;

(b) an optical detecting mechanism arranged to correspond to an edge region of the wafer supported by said worktable, said optical detecting mechanism comprising, a light emitter for emitting a parallel luminous flux to the edge region of the wafer supported by said worktable, a light receiver for receiving the parallel luminous flux, arranged on an optical axis of said light emitter to face said light emitter through the edge region of the wafer supported by said worktable, said light receiver being arranged to output a signal having a level corresponding to a received light quantity, and a light shielding slit plate having a slit arranged on an optical path of the parallel luminous flux, said slit having such a width in an angular direction relative to said reference center, that is set to be narrow enough to cause a degree of shading of the parallel luminous flux by the wafer to be a one-dimensional data in a radial direction relative to said reference center;

(c) a driver for selectively rotating said worktable; and (d) an arithmetic section for computing a central position of the wafer relative to said reference center, from output levels of said light receiver, which are obtained when at least three positions on the edge region of the wafer are placed between said light emitter and said light receiver, and the parallel luminous flux is partly shaded by the wafer.

9. The apparatus according to claim 8, wherein said width of said slit is set to fall in a range of 0.2 to 5 mm.

10. The apparatus according to claim 8, wherein said slit has a center at a position separated from said reference center by a distance substantially equal to a radius of the wafer.

11. The apparatus according to claim 8, wherein said slit extends in a radial direction relative to said reference center, and said width of said slit is substantially constant all over a length of the slit.

12. The apparatus according to claim 8, wherein the parallel luminous flux comprises infrared rays, and an infrared-ray transmission filter is arranged on the optical path of the parallel luminous flux.

13. The apparatus according to claim 8, wherein a light shielding pinhole plate having a pinhole on the optical axis of said light emitter is arranged immediately before the light receiver.

14. The apparatus according to claim 8, further comprising an X-Y stage supporting said worktable, and means for controlling said X-Y stage, based on the central position of the wafer relative to said reference center computed by said arithmetic section.

15. A position detecting apparatus for a semiconductor wafer comprising:

(a) a support for supporting the wafer such that a reference center for positioning the wafer is positioned in a contour of the wafer;

(b) optical detecting mechanisms arranged to correspond to at least three positions on an edge region of the wafer supported by said support, each of said optical detecting mechanisms comprising, a light emitter for emitting a parallel luminous flux to the edge region of the wafer supported by said support, a light receiver for receiving the parallel luminous flux, arranged on an optical axis of said light emitter to face said light emitter through the edge region of the wafer supported by said support, said light receiver being arranged to output a signal having a level corresponding to a received light quantity, and a light shielding slit plate having a slit arranged on an optical path of the parallel luminous flux, said slit having such a width in an angular direction relative to said reference center, that is set to be narrow enough to cause a degree of shading of the parallel luminous flux by the wafer to be a one-dimensional data in a radial direction relative to said reference center;

(c) an arithmetic section for computing a central position of the wafer relative to said reference center, from output levels of the light receivers of said optical detecting mechanisms, which are obtained when the parallel luminous flux is partly shaded by the wafer between said light emitter and said light receiver in each of said optical detecting mechanisms.

16. The apparatus according to claim 15, wherein said width of said slit is set to fall in a range of 0.2 to 5 mm.

17. The apparatus according to claim 15, wherein said slit has a center at a position separated from said reference center by a distance substantially equal to a radius of the wafer.

18. The apparatus according to claim 15, wherein said slit extends in a radial direction relative to said reference center, and said width of said slit is substantially constant all over a length of the slit.

19. The apparatus according to claim 15, wherein the parallel luminous flux comprises infrared rays, and an infrared-ray transmission filter is arranged on the optical path of the parallel luminous flux.

20. The apparatus according to claim 15, wherein a light shielding pinhole plate having a pinhole on the optical axis of said light emitter is arranged immediately before the light receiver.

21. The apparatus according to claim 15, further comprising an X-Y stage supporting said support, and means for controlling said X-Y stage, based on the central position of the wafer relative to said reference center computed by said arithmetic section.

* * * * *